United States Patent

Chambrion et al.

(10) Patent No.: US 8,474,585 B2
(45) Date of Patent: Jul. 2, 2013

(54) CLUTCH DEVICE

(75) Inventors: Martin Chambrion, Herrlisheim (FR);
Yannick Simon, Lauterbourg (FR);
Christoph Raber, Ottweiler-Steinbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/458,171

(22) Filed: Apr. 27, 2012

(65) Prior Publication Data

US 2012/0247914 A1 Oct. 4, 2012

Related U.S. Application Data

(63) Continuation of application No. PCT/DE2010/001226, filed on Oct. 18, 2010.

(30) Foreign Application Priority Data

| Oct. 29, 2009 | (DE) | 10 2009 051 243 |
| Dec. 21, 2009 | (DE) | 10 2009 059 738 |
| Jun. 29, 2010 | (DE) | 10 2010 025 411 |
| Aug. 2, 2010 | (DE) | 10 2010 033 064 |

(51) Int. Cl.
*F16D 21/08* (2006.01)
*F16D 21/06* (2006.01)

(52) U.S. Cl.
USPC ....... 192/48.1; 192/35; 192/54.52; 192/70.23

(58) Field of Classification Search
USPC .................. 192/207, 211, 55.6; 464/100, 101
See application file for complete search history.

(56) References Cited

U.S. PATENT DOCUMENTS

| 459,325 | A | * | 9/1891 | Whitney | 464/84 |
| 1,993,125 | A | * | 3/1935 | Tower et al. | 464/82 |
| 2,053,849 | A | * | 9/1936 | Spase | 192/207 |
| 4,101,015 | A | * | 7/1978 | Radke | 192/213.2 |
| 4,295,348 | A | * | 10/1981 | Helfer et al. | 464/82 |
| 4,470,494 | A | * | 9/1984 | Takeuchi | 192/213.31 |
| 5,692,410 | A | * | 12/1997 | Fenelon | 464/100 |
| 2005/0167229 | A1 | * | 8/2005 | Tsukada et al. | 192/54.52 |

FOREIGN PATENT DOCUMENTS

| DE | 3206068 | 9/1982 |
| JP | 2005344920 | 12/2005 |
| WO | 9531653 | 11/1995 |

* cited by examiner

*Primary Examiner* — Rodney Bonck
(74) *Attorney, Agent, or Firm* — Simpson & Simpson, PLLC

(57) ABSTRACT

The invention relates to a clutch device, for example, a booster clutch device, including a first clutch element and a second clutch element, where a torsion spring device is provided coupling the first clutch element to the second clutch element, the torsion spring device having a multi-stage spring characteristic.

16 Claims, 4 Drawing Sheets

CLUTCH DEVICE

CROSS-REFERENCE TO RELATED APPLICATIONS

This application is filed under 35 U.S.C. §120 and §365(c) as a continuation of International Patent Application No. PCT/DE2010/001226 filed Oct. 18, 2010, which application claims priority from German Patent Application No. 10 2009 051 243.8 filed Oct. 29, 2009 and German Patent Application No. 10 2009 059 738.7 filed Dec. 21, 2009 and German Patent Application No. 10 2010 025 411.8 filed Jun. 29, 2010 and German Patent Application No. 10 2010 033 064.7 filed Aug. 2, 2010, which applications are incorporated herein by reference in their entireties.

FIELD OF THE INVENTION

The invention broadly relates to a vehicle clutch device, and more particularly, to a booster clutch.

BACKGROUND OF THE INVENTION

Methods must be pursued to significantly lower the actuating forces of a clutch. One possibility is to use a so-called booster clutch. This clutch system has a pilot clutch and a main clutch. Both elements are connected to each other via rolling elements by means of a ramp system. When the pilot clutch engages, the accumulated torque rotates the ramps of the ramp system, thereby engaging the main clutch. The energy required to actuate the main clutch is provided by the engine in this system, and only the force for engaging the pilot clutch needs to be applied from the outside.

BRIEF SUMMARY OF THE INVENTION

One object of the present invention is to provide an improved clutch device.

Another object of the invention is to provide a clutch device where the clutch device, preferably a booster clutch device, includes a first clutch element and a second clutch element, where a torsion spring device is provided that couples or connects the first clutch element to the second clutch element, the torsion spring device being designed to have or provide a multi-stage spring characteristic.

The advantage is that the spring characteristic can be adapted to a suitable or desired characteristic by its stages. The spring characteristic of the torsion spring device can be made to approximate a lining characteristic or an exponential characteristic. With a booster clutch an example of a clutch device, the pressure of the main clutch can, for example, be better adapted to an engine torque that is to be transmitted.

In one embodiment, the first clutch element is a clutch flange, and the second clutch element is a clutch hub.

In another embodiment, the torsion spring device includes a compression spring device that has at least one compression spring, which can be compressed by the first clutch element or the clutch flange, and the second clutch element or the clutch hub in the clutch device.

In yet another embodiment, the torsion spring device has a leaf spring device, where the leaf spring device is provided, preferably on the clutch hub, and has at least one leaf spring package including at least one leaf spring. The advantage of the leaf springs is that they are highly rigid in contrast to compression springs, and hence different rigidities can be provided and combined in the torsion spring device.

In another embodiment, the leaf spring device is connected to the clutch, such that it can be brought into contact with the clutch flange in a contact section when the spring clutch characteristic of the torsion spring device has two stages. With a two-stage torsion spring device, a third additional contact is not provided, for example, by a leaf spring and clutch hub, at the end or in the area of the end of the leaf spring seat in the hub.

In yet another embodiment, the leaf spring device is connected to the clutch hub, such that it can be brought into contact with the clutch flange in a contact area when the torsion spring unit has a three-stage spring characteristic, and can also be brought into contact with the clutch hub in a contact area. This allows an exponential spring characteristic to be closely approximated.

In another embodiment, the clutch hub has a leaf spring seat, where the leaf spring seat is designed as a recess in which the leaf spring device is accommodated and fastened, where the leaf spring device projects from the leaf spring seat so that it can be brought into contact with a step or stop of the clutch flange, where the step or stop of the clutch flange is designed as a projection, recess or cutout.

In yet another embodiment, when the torsion spring device has a three-stage spring characteristic, the seat of the leaf spring device also has a contact area by means of which the leaf spring device can be brought into contact with the clutch hub in addition to the clutch flange, for example, at an end or an end section of the leaf spring seat in the hub. This can additionally increase the rigidity.

In another embodiment, the natural rigidity of the first clutch element or clutch flange and/or the second clutch element or clutch hub is designed to be variable so that, for example, a leaf spring device can be dispensed with, and the spring characteristic of the torsion spring device can approximate an exponential characteristic.

BRIEF DESCRIPTION OF THE SEVERAL VIEWS OF THE DRAWING

The nature and mode of operation of the present invention will now be more fully described in the following detailed description of the invention taken with the accompanying drawing figures, in which.

The same reference numbers in the following figures refer to equivalent or similar components if not otherwise indicated.

DETAILED DESCRIPTION OF THE INVENTION

Figure 1:
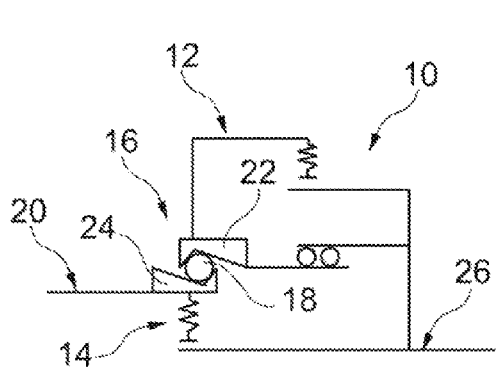
FIG. 1 shows a translatory illustration of a present invention booster clutch device.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

As show in FIGS. 1 through 13, the invention relates to a clutch device, (hereinafter referred to as booster clutch device 10), having a first clutch (hereinafter referred to as pilot clutch 12), and a second clutch (hereinafter referred to as main clutch 14), that are connected to each other by ramp system 16 via rolling elements 18. Booster clutch device 10 can be used in a vehicle such as a passenger car, truck, or motorcycle.

FIG. 1 shows a translatory illustration of booster clutch device 10. Booster clutch device 10 allows the disengagement force to be reduced by using the engine torque of engine 20. Booster clutch device 10 includes pilot clutch 12 and main clutch 14 that are connected to one another via rolling elements 18 by means of ramp system 16. Ramp system 16 includes first ramp 22 and second ramp 24 that are connected to each other by means of corresponding rolling elements 18. Ramp system 16 forms a ball ramp, for example. Engine 20 and transmission 26 are connected to booster clutch device 10. In the translatory illustration of booster clutch device 10 shown in FIG. 1, a vertical movement in the figure corresponds to an axial movement in the clutch device, and a horizontal movement in the figure corresponds to a rotation or twist of the clutch device.

Figure 2:
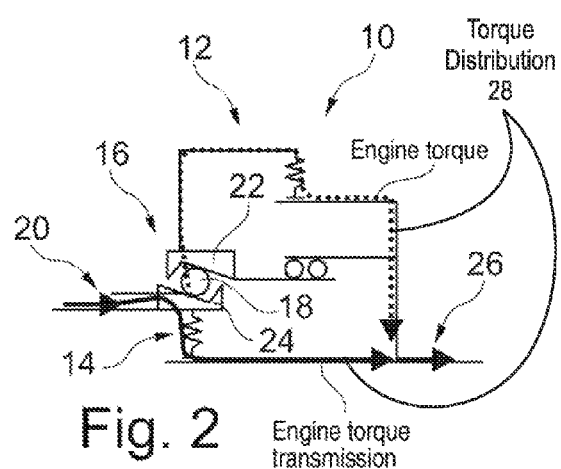
FIG. 2 shows the torque distribution in the booster clutch device of FIG. 1.

In FIG. 2, booster clutch device 10 is shown with main clutch 14 and pilot clutch 12, along with engine 20 and transmission 26. The clutch function of booster clutch device 10 is shown as well as torque distribution 28. Actuating the clutch affects pilot clutch 12. Pilot clutch 12 draws approximately, for example, one-tenth of the maximum engine torque from engine 20, which the ball ramp or ramp system 16 translates into axial force. This force acts as pressure in main clutch 14, which can assume the primary transmission of engine torque.

The problem that arises when booster clutch device 10 is constructed in this manner is that ramps 22, 24 of the ball ramps or ramp system 16 can jam. This problem can be solved with a torque sensor or torque sensor device.

Figure 3:
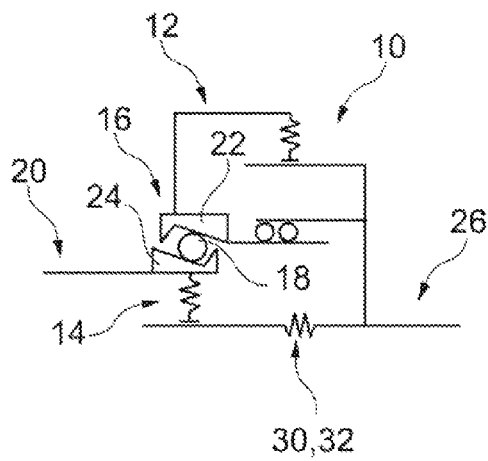
FIG. 3 shows a translatory illustration of the booster clutch device with a torque sensor.

FIG. 3 shows a translatory illustration of booster clutch device 10 with torque sensor device 30. Booster clutch device 10 has pilot clutch 12 and main clutch 14. Furthermore, engine 20 and transmission 26 are shown that are connected or coupled to booster clutch device 10. Pilot clutch 12 and main clutch 14 are connected to each other via rolling elements 18 by means of ramp system 16 that has first ramp 22 and second ramp 24.

In terms of the design, torque sensor device 30 can be seen as torsion spring device 32 that is located between transmission 26 and main clutch 14. When the load changes, the transmitted torque in the drivetrain changes, consequently altering the tension of torsion spring device 32.

To date, there have been no guidelines regarding the design of the torsion spring or torsion spring device 32. Even when ramps 22, 24 of ramp system 16 do not jam, booster clutch device 10 reacts very sensitively to a load change. The problem is that the force/path lining characteristic is exponential and nonlinear. When designing torsion spring device 32, it would therefore be preferable for the torsion spring characteristic to be substantially exponential to ensure that ramps 22, 24 release cleanly and reliably.

When a load changes, the torque to be transmitted also changes. The goal is to adapt the pressure of main clutch 14 to this torque to be transmitted.

Figure 4:
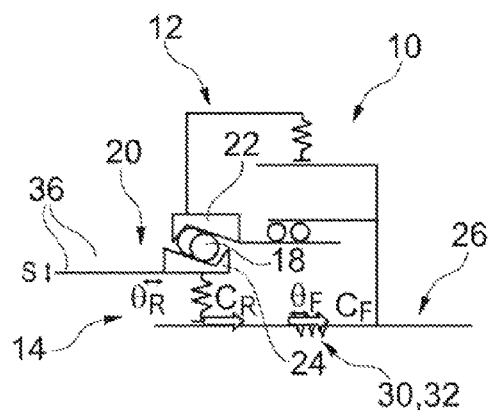
FIG. 4 shows a translatory illustration of the booster clutch device with the torque sensor when the load changes.

FIG. 4 shows a translatory illustration of another embodiment of booster clutch device 10 having torque sensor device 30, as well as engine 20 and transmission 26 that are connected to booster clutch device 10. As described above, booster clutch device 10 has pilot clutch 12 and main clutch 14 that are connected to one another via rolling elements 18 by means of ramp system 16 having two ramps 22, 24. FIG. 4 is used to explain how torsion spring device 32 can be further optimized. FIG. 4 shows the behavior of booster clutch device 10 having torque sensor device 30 under a load change.

Transmissible torque $C_R$ corresponds to main clutch pressure. The main clutch pressure corresponds to axial shift S of pressure plate 36, such as a disc package. Axial shift S corresponds to a rotation of ramp 22, 24 by angle $\theta_R$. Consequently, transmissible torque $C_R$ corresponds to rotation of ramp 22, 24 by angle $\theta_R$. Characteristic A FIG. 5 corresponds to the ramp torque characteristic.

If torque sensor device 30 is used in the drivetrain, a variation in torque from a load change triggers rotation since torsion spring angle $\theta_F$ corresponds to torque $C_F$. Characteristic B in FIG. 5 corresponds to the torsion spring characteristic.

Figure 5:
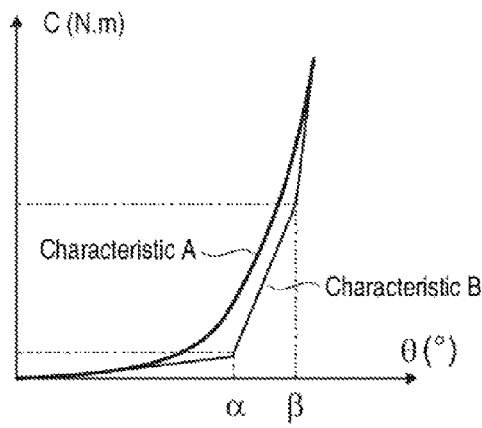
FIG. 5 shows a diagram with the characteristic of the ramp torque and torsion spring.

FIG. 5 shows a diagram depicting characteristic A of the ramp torque and characteristic B of the torsion spring. The two axes of the diagram represent torque C in Nm in relation to torque angle θ. The torsion spring characteristic, or characteristic B, is preferably designed so that it is equivalent or at least approximately equivalent to the ramp torque characteristic, or characteristic A. If this condition is not satisfied, the ramps of the ramp system can remain jammed, or the entire clutch device can irregularly adjust or set the transmissible torque.

If the torsion spring rigidity is less than the ramp torque rigidity, the torsion spring device or torsion spring rotates excessively, causing a ramp to assume a position at which the pressure is insufficient in relation to the transmissible torque. Due to this imbalance, the ramp needs to be rotated or twisted in the opposite direction.

If the torsion spring rigidity is greater than the ramp torque rigidity, the ramp can remain jammed. The closer characteristics A and B are, the smoother the load change.

A multi-stage torque sensor device or a multistage torsion spring device is therefore used with a characteristic that is as close as possible to the ramp torque characteristic. For example, a three-stage torsion spring device is provided with a characteristic that is as close as possible to the ramp torque characteristic.

As shown in FIG. 5, the torsion spring or characteristic B has a three-stage structure. Three-stage characteristic B is achieved in the following manner: a compression spring device having at least one compression spring acts during the first stage, and then the compression spring device and a leaf spring device act together.

Figure 6:
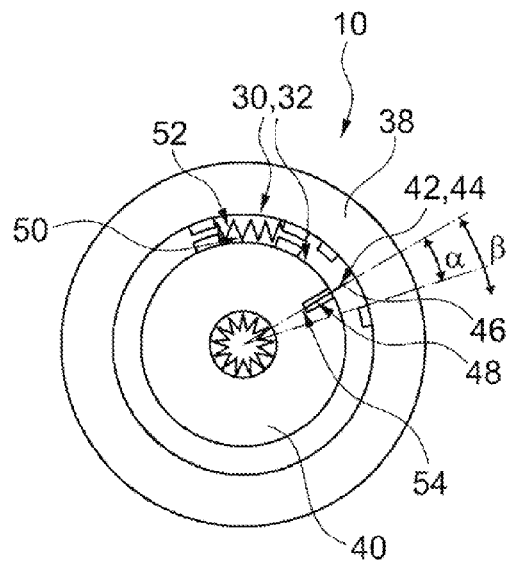
FIG. 6 shows a schematic view of a clutch flange and a clutch hub of the booster clutch device in home position.

FIG. 6 shows a schematic and simplified illustration of the interaction between a first clutch element (hereinafter referred to as clutch flange 38) and a second clutch element (hereinafter referred to as clutch hub 40) of booster clutch device 10, wherein multistage torque sensor device 30 or multistage torsion spring device 32 is provided. To be more precise, three-stage torsion spring device 32 is provided. FIG. 6 shows the torsion spring state in a home position. Torsion spring device 32 comprises leaf spring device 42 having at least one leaf spring package 44 including at least one leaf spring 46. Leaf spring 46 is attached to leaf spring seat 48, for example, in the form of a recess in clutch hub 40. Furthermore, torsion spring device 32 has compression spring device 50 including at least one compression spring 52. In doing so, compression spring 52 connects or couples clutch hub 40 and clutch flange 38.

In home position as shown in FIG. 6, angle α can arise between leaf spring device 42, which is firmly connected to clutch hub 40, and clutch flange 38. Compression spring device 50 that is arranged or fastened between clutch hub 40 and clutch flange 38 is, for example, already pre-tensioned.

Figure 7:
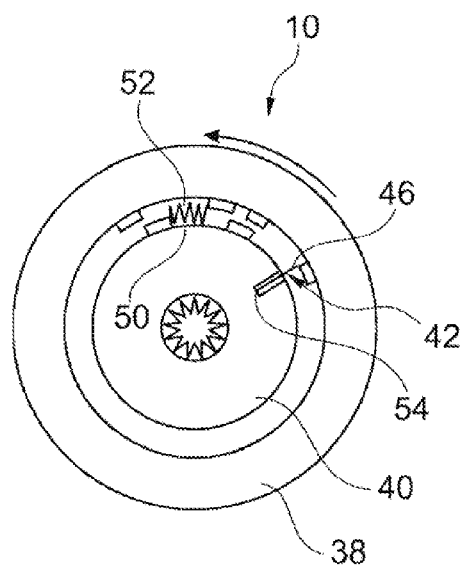
FIG. 7 shows a schematic view of the clutch flange and the clutch hub of the booster clutch device of FIG. 6 at a small angle.

FIG. 7 also shows a schematic and simplified illustration of the interaction between the flange 38 and hub 40 of the clutch device 10 according to FIG. 6. In this instance, the multistage torque sensor device 30 or multistage torsion spring device 32 is a three-stage torsion spring device 32.

FIG. 7 portrays the torsion spring state of torsion spring device 32 when there is a small angle, i.e., an angle that, for example, is less than angle α between leaf spring 46 and clutch flange 38. When clutch flange 38 rotates a small angle, the rigidity of torsion spring device 32 is low since only compression spring 52 of compression spring device 50 is active as shown in FIG. 7, and not leaf spring 46 of leaf spring device 42.

Figure 8:
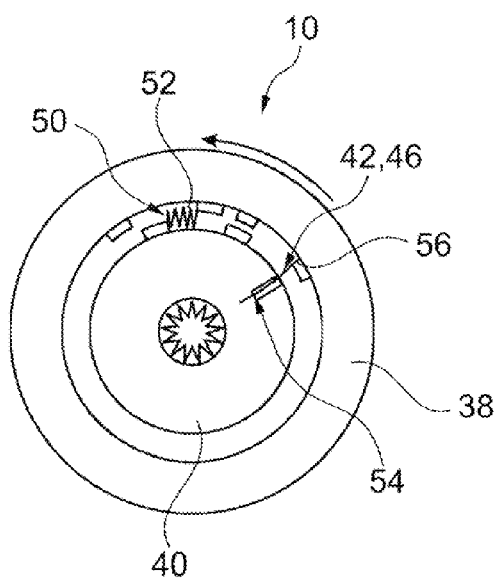
FIG. 8 shows a schematic view of the clutch flange and the clutch hub of the booster clutch device of FIG. 7 at an angle that is greater than angle α and less than angle β.

FIG. 8 also shows a schematic and simplified illustration of the interaction between clutch flange 38 and clutch hub 40 of booster clutch device 10 of FIG. 7. Multistage torque sensor device 30 or multistage torsion spring device 32 is also three-stage torsion spring device 32 in this instance.

FIG. 8 shows the torsion spring state only when the angle between leaf spring 46 of leaf spring device 42 and clutch flange 38 is greater than angle α and less than angle β. As shown in FIGS. 6 and 8, leaf spring 46 of leaf spring device 42 contacts clutch flange 38 starting at angle α, which significantly increases the rigidity. With clutch hub 40, leaf spring 46 forms first contact or contact area 54 where, for example, it is mounted or fastened to clutch hub 40. Furthermore, leaf spring 46 forms second contact or contact area 56 with clutch flange 38 where it contacts clutch flange 38 when, as shown in FIG. 8, clutch flange 38 rotates relative to clutch hub 40 by an angle that is greater than angle α and less than angle β. As shown in FIG. 8, compression spring 52 of compression spring device 50 is also active.

Figure 9:
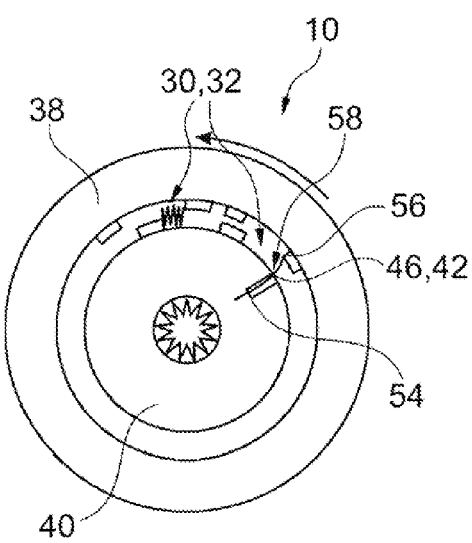
FIG. 9 shows a schematic view of the clutch flange and the clutch hub of the booster clutch device of FIG. 8 at an angle that is greater than angle β.

FIG. 9 shows a schematic and simplified illustration of the interaction between clutch flange 38 and clutch hub 40 of booster clutch device 10 of FIG. 8. Multistage torque sensor device 30 or multistage torsion spring device 32, in this instance, a three-stage torsion spring device 32, is provided.

FIG. 9 shows the torsion state at an angle greater than angle β between leaf spring 46 of leaf spring device 42 and clutch flange 38. The bearing of leaf spring 46 of leaf spring device 42 changes starting at angle β between leaf spring 46 and clutch flange 38 as shown in FIG. 9. Leaf spring 46 of leaf spring device 42 shown in FIG. 9, contacts clutch hub 40 at third contact area 58. It is very difficult to bend leaf spring 46, which increases the torsional rigidity.

Figure 10:
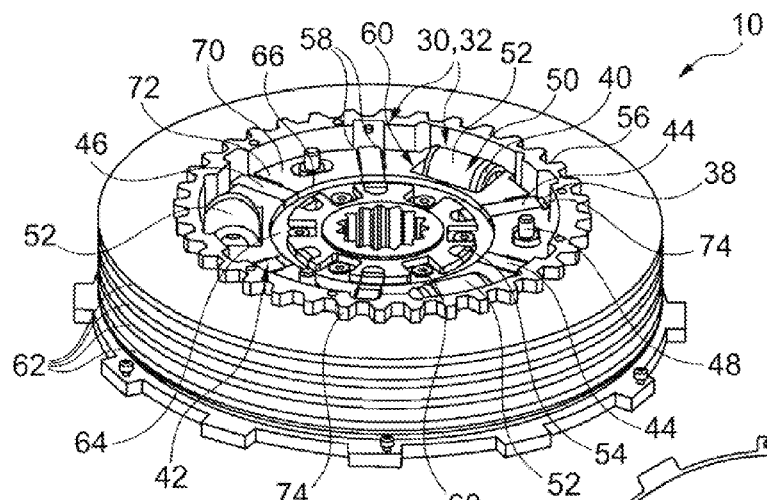
FIG. 10 shows a perspective view of the booster clutch device.

FIG. 10 shows a perspective view of an embodiment of booster clutch device 10 or part thereof that, for example, can have a first clutch, a pilot clutch in this instance, and a second clutch, a main clutch in this instance, that can also be connected to each other via roller elements by means of a ramp system having, for example, a first and second ramp. Booster clutch device 10 has, for example, three-stage torsion spring device 32, the principle of which was previously described, with reference to FIGS. 5 through 9.

Booster clutch device 10 shown in FIG. 10 can be a clutch device for a motorcycle, and forms a motorcycle clutch device. Likewise, booster clutch device 10 can also be designed, for example, for a passenger car, truck or other vehicle. In addition to being used in a booster clutch device, multistage torsion spring device 32 or torque sensor device 30 described below can also be used in conventional clutch devices, such as clutch devices having a dampened disk, or in any other clutch device that is suitable for use with the multistage torsion spring device 32 or torque sensor device 30.

As shown in FIG. 10, booster clutch device 10 has, for example, clutch flange 38 and clutch hub 40. Leaf spring device 42 is provided in clutch hub 40 and one or in this case a plurality of leaf springs 46, forming leaf spring set 44, is accommodated and mounted or fastened in corresponding spring seats 48 of clutch hub 40. Furthermore, compression spring device 50 is provided, where a plurality of compression springs 52 are accommodated in compression spring seats 60, for example, in clutch hub 40, and connect or couple clutch hub 40 and clutch flange 38.

Figure 11:
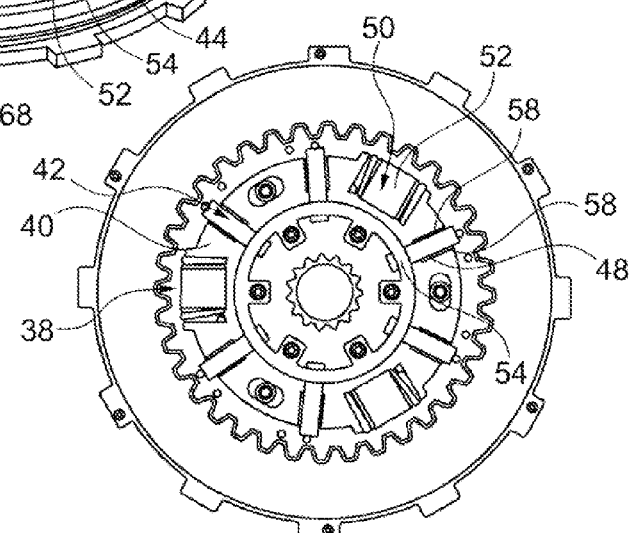
FIG. 11 shows a top plan view of the booster clutch device of FIG. 10.

FIG. 11 shows a top plan view of booster clutch device 10, having disc package 62 of FIG. 10. Clutch hub 40 is shown in which leaf spring package 44 including a plurality of leaf springs 46 is arranged and fastened in leaf spring seats 48. Leaf spring seat 48 is, for example, designed in the form of a recess in which leaf spring package 44 is inserted and fastened by means of fastening element 64, such as a fasting ring. Leaf springs 46 have seat 66 for fastening ring 64, for example, in the form of a recess in which fastening ring 64 is accommodated. Fastening ring 64 is also fastened to clutch hub 40, for example, by means of screws. Leaf spring package 44 projects out of respective leaf spring seat 48 of clutch hub 40 and can be brought into contact with first and second contact section 70, 72 of clutch flange 38 to form second and third contact 56, 58 when clutch flange 38 and clutch hub 40 are rotated or twisted relative to one another as described above with reference to FIGS. 5 through 9. Leaf spring package 44 with its attachment to leaf spring seat 48 forms first contact 54 as described above with reference to FIGS. 6 and 7.

Respective leaf spring package 44 can form so-called second contact 56 with clutch flange 38 and so-called third contact 58 with clutch hub 40, depending on how much clutch flange 38 and clutch hub 40 are rotated or twisted relative to one another.

If there is only one so-called first contact 54 as described above with reference to FIGS. 6 and 7, the angle between the leaf spring device 42 and clutch flange 38 is less than or equal to angle α. In this case, only compression springs 52 act when they are pressed together by or between clutch flange 38 and clutch hub 40. Leaf spring device 42 or leaf spring package 44 is not active in this case as explained above with reference to FIGS. 6 and 7.

To provide additional second contact 56 between leaf spring package 44 and clutch flange 38, clutch flange 38 has, for example, a stop 74 that is formed by a recess or cutout as shown in FIG. 10, or a projection as shown in FIGS. 6 through 9. Second contact 56 results when leaf spring package 44 contacts stop 74 of clutch flange 38, in this instance the side wall of the recess in clutch flange 38, or the side wall of the projection in FIGS. 6 through 9. The instance in which there are two contacts 54, 56 has already been described above with reference to FIG. 8. In this instance, the angle between leaf spring device 42 and clutch flange 38 is greater than angle α and smaller than angle β. Compression springs 52 are also active in this case since they are compressed together further by clutch hub 40 and clutch flange 38.

Figure 12:
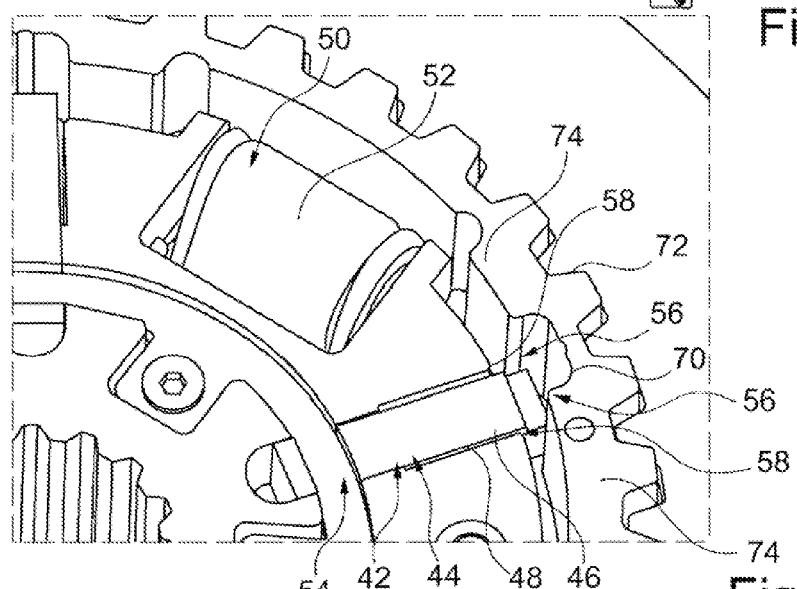
FIG. 12 shows a section of the booster clutch device of FIG. 11.

Third contact 58 results when clutch hub 40 and clutch flange 38 are rotated or twisted relative to each other so that leaf spring package 44 additionally touches clutch hub 40, for example, at the top end of leaf spring seat 48 of clutch hub 40 as shown in FIG. 12. The case in which there are three contacts 54, 56, 58 was explained above in an example with reference to FIG. 9. In this case, the angle between leaf spring device 42 and clutch flange 38 is greater than the angle β. This yields greater torsional rigidity. Furthermore, compression springs 52 are also active in this instance that are pressed together by clutch hub 40 and clutch flange 38.

FIG. 12 shows an enlarged section of booster clutch device 10 of FIGS. 10 and 11. The section shows leaf spring seat 48 of clutch hub 40 in which leaf spring package 44 including a plurality of leaf springs 46 is arranged. Leaf springs 46 are fastened in seat 48 by means of fastening element 64, such as fastening ring 64 in this case, and fastening ring 64 is guided in seat 66 in the form, for example, of a cutout or recess in leaf spring package 44 and is screwed to clutch hub 40. Leaf spring package 44 projects out of leaf spring seat 48 into a seat in the form of a recess in clutch flange 38. Furthermore, compression spring 52 of compression spring device 50 is shown, which is arranged such that it is compressible on one side by clutch flange 38 and on the other side by clutch hub 40. In FIG. 12, torsion spring device 32 including leaf spring device 42 and compression spring device 50 is in a home position in which, for example, only compression spring device 50 is active, that is, compression springs 52 are compressed by clutch flange 38 and clutch hub 40. FIG. 12 therefore shows the instance described above with reference to FIGS. 6 and 7 in which the angle between leaf spring device 42 and clutch flange 38 is less than or equal to angle α. In this case, only compression springs 52 act when they are pressed together by or between clutch flange 38 and clutch hub 40. Leaf spring device 42 or leaf spring package 44 is not active in this case as explained above with reference to FIGS. 6 and 7. In FIG. 12, contacts 54, 56, and 58 are shown, as well, leaf spring device 42 or respective spring package 44 contacts stop 74 of clutch flange 38 and also clutch hub 40, here for example, the end of leaf spring seat 48 of clutch hub 40.

Figure 13:
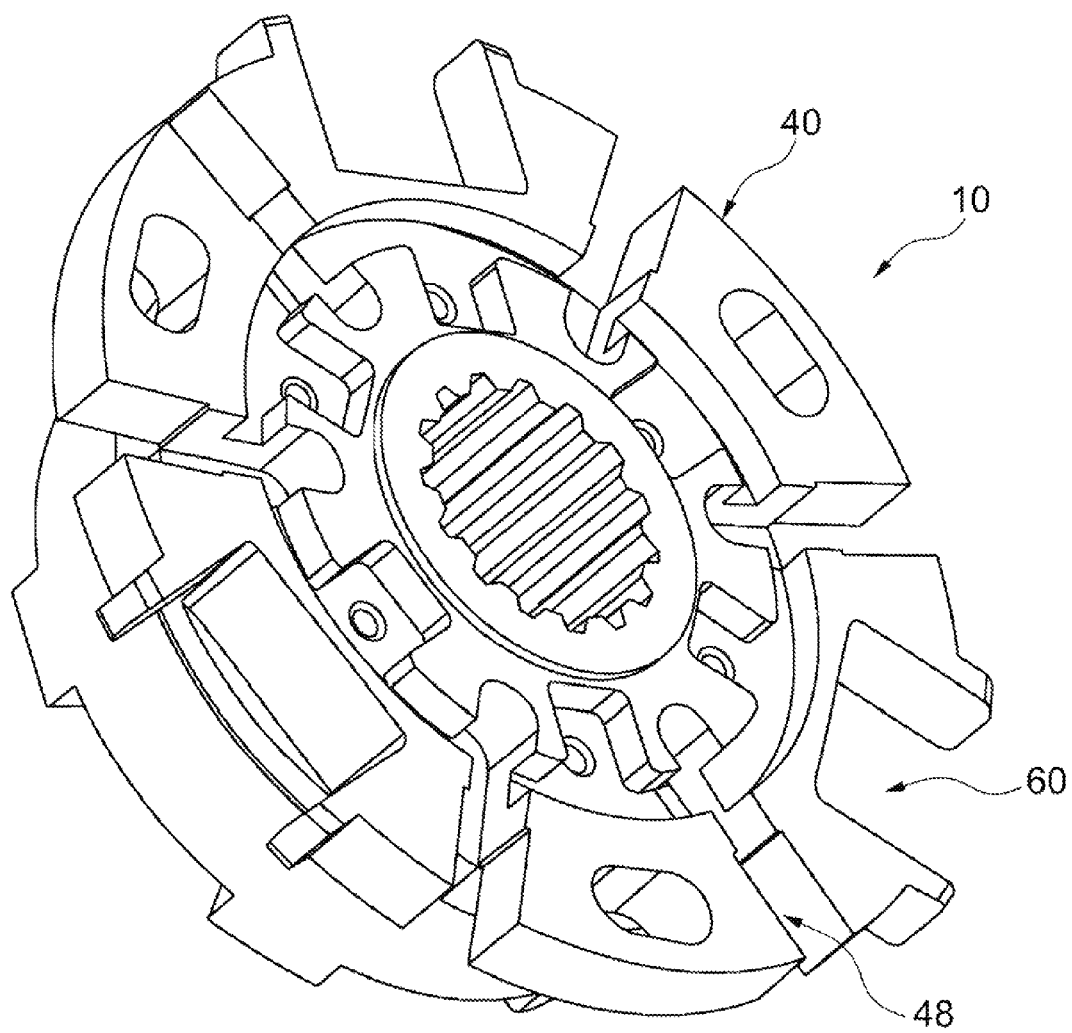
FIG. 13 shows a perspective view of the clutch hub of the booster clutch device of FIG. 10.

FIG. 13 shows a perspective view of clutch hub 40 of FIGS. 10 through 12 without a torsion spring device and clutch flange. FIG. 13 shows seats 48 for the leaf spring package of the leaf spring device and seats 60 for the compression springs of the compression spring device. Clutch hub 40 can be connected to the gearing of the main clutch such as a booster clutch device as well as the clutch flange (not shown in FIG. 13). A disc package (not shown in FIG. 13) that is connected to the clutch flange also belongs for example to the main clutch. Engine torque of an engine can be transmitted via the disc package to the clutch flange, from there via the torsion spring device with its compression spring device and leaf spring device to the clutch hub, and from there to the transmission.

As described above, the invention is not restricted to a booster clutch, and can also be realized by other clutches which do not necessarily have to have a first clutch or pilot clutch and a second clutch or main clutch. In addition, the clutch does not necessarily have to have a ramp system with rolling elements.

As the engine torque increases, the pressure (and consequently the disengagement force) increases gradually and this impairs driving comfort. The desire for economical systems that would reduce the disengagement force is therefore significant. Consequently, the booster clutch has a great opportunity of being successful and is therefore relevant to the invention without being restrictive. Nonetheless, this system has little or no side effects that could impair driver comfort.

Booster clutches can react sensitively to a load change, and their ball ramp can jam. Consequently as described above, a torque sensor can be used in the main clutch that in practice is a torsion spring with a torque-angle characteristic that corresponds to the lining characteristic (exponential characteristic) or approximates it as closely as possible as indicated in FIG. 5. In the design, this characteristic is generated by means of a compression spring/leaf spring combination.

This allows the ball ramp to smoothly release. To improve the behavior under load changes and the push-pull behavior of such a booster clutch, the pressure of the main clutch is adapted as precisely as possible to the engine torque to be transmitted.

As described above, the design can consist of a combination of leaf springs and compression springs that form a three-stage characteristic B as shown above in FIG. 5. In addition to a three-stage characteristic, a two-stage characteristic can also work in which the leaf spring device, or at least one of its leaf springs, can be provided on the clutch hub so that there is only a second contact and not a third contact. That is, the leaf spring device is arranged on the clutch hub such that it can contact the clutch flange (second contact) when the clutch flange and clutch hub are rotated or twisted sufficiently relative to each other, but there is no third contact where the leaf spring device additionally contacts the clutch hub when the clutch flange and clutch hub are rotated or twisted further.

In principle, a characteristic with more than three stages is conceivable. In another embodiment, it is also possible for the natural rigidity of the flange or clutch flange and/or the hub or the clutch hub to vary, where the leaf springs can, but do not have to, be discarded.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

List of Reference Numbers
10 Clutch device
12 First clutch or pilot clutch
14 Second clutch or main clutch
16 Ramp system
18 Rolling element
20 Engine
22 First ramp
24 Second ramp
26 Transmission
28 Torque distribution
30 Torque sensor (device)
32 Torsion spring device
34 Torsion spring characteristic
36 Pressure plate
38 Clutch flange
40 Clutch hub
42 Leaf spring device
44 Leaf spring package
46 Leaf spring
48 Leaf spring seat
50 Compression spring device
52 Compression spring
54 1st contact
56 2nd contact
58 3rd contact
60 Compression spring seat
62 Disc package
64 Fastening element
66 Seat
68 Screw
70 1st contact section
72 2nd contact section
74 Stop

What is claimed is:

1. A booster clutch device comprising:
a ramp system including:
a torque rigidity;
a first ramp;
a second ramp rotatable with respect to the first ramp and arranged to receive torque in a first rotational direction; and,
at least one rolling element engaged with the first and second ramps;
a first clutch engaged with the first ramp;
a second clutch engaged with the second ramp and including at least one disc and an output including first and second clutch elements; and,
a torque sensor, wherein:
in response to the torque:
the first and second ramps non-rotatably engage;
the first and second clutches close;
the first clutch element is rotatable with respect to the second clutch element in the first rotational direction to engage the torque sensor; and,
the torque sensor urges the first clutch element in the second rotational direction with respect to the second clutch element; and,
in response to a decrease in the torque, the torque sensor rotates the second ramp with respect to the first ramp.

2. The booster clutch device as recited in claim 1, wherein the first clutch element is a clutch flange, and the second clutch element is a clutch hub.

3. The booster clutch device as recited in claim 2, wherein the torsion spring device further comprises a compression spring device having at least one compression spring that is compressible in the clutch device by the clutch flange and the clutch hub.

4. The booster clutch device as recited in claim 2, wherein the torsion spring device further comprises a leaf spring device, wherein the leaf spring device is provided in the clutch hub, and has at least one leaf spring package comprising at least one leaf spring.

5. The booster clutch device as recited in claim 4, wherein the leaf spring device is connected to the clutch hub, such that it can be brought into contact with the clutch flange, when the torsion spring device has a two-stage spring characteristic.

6. The booster clutch device as recited in claim 4, wherein the leaf spring device is connected to the clutch hub, such that it can be brought into contact with the clutch flange, and with the clutch hub, when the torsion spring device has a three-stage spring characteristic.

7. The booster clutch device as recited in claim 4, wherein the clutch hub has a leaf spring seat, wherein the leaf spring seat is designed as a recess in which the leaf spring device is accommodated and fastened, wherein the leaf spring device projects from the leaf spring seat, such that it can be brought into contact with a stop of the clutch flange, wherein the stop is designed as a projection or recess or cutout.

8. The booster clutch device as recited in claim 7, wherein the seat of the leaf spring device comprises a contact area by means of which the leaf spring device can be brought into contact with the clutch flange, and also into contact with the contact area of the clutch hub, when the torsion spring device has a three stage spring characteristic.

9. The booster clutch device as recited in claim 1, wherein the torsion spring device further comprises a compression spring device having at least one compression spring that is compressible in the clutch device by the first clutch element and the second clutch element.

10. The booster clutch device as recited in claim 1, wherein the torsion spring device further comprises a leaf spring device, wherein the leaf spring device is provided in the first clutch element, and has at least one leaf spring package comprising at least one leaf spring.

11. The booster clutch device as recited in claim 1, wherein the torsion spring device further comprises a leaf spring device, wherein the leaf spring device is provided in the second clutch element, and has at least one leaf spring package comprising at least one leaf spring.

12. The booster clutch device as recited in claim 1, wherein a natural rigidity of the first clutch element or the second clutch element is designed to be variable.

13. The booster clutch device as recited in claim 1, wherein a natural rigidity of the first clutch element and the second clutch element is designed to be variable.

14. The clutch device as recited in claim 1, wherein a spring characteristic of the torsion spring device corresponds to or approximates a lining characteristic or an exponential characteristic.

15. A booster clutch device comprising:
a ramp system including:
a first ramp;
a second ramp rotatable with respect to the first ramp; and,
at least one rolling element engaged with the first and second ramps;
a first clutch engaged with the first ramp;
a second clutch engaged with the second ramp and including a plurality of discs and an output having a flange and a clutch hub; and, a torque sensor including a compression spring and a leaf spring coupling the flange and the clutch hub, wherein:
rotational torque transmitted to the second ramp in a first direction is arranged to clamp the plurality of discs with a first force to close the second clutch; and,
when the rotational torque in the first direction increases beyond a first amount, the torque sensor is arranged to increase a second force urging the flange in a second direction, opposite the first direction, to decrease the first force.

16. A booster clutch device comprising:
a ramp system including:
 a first ramp;
 a second ramp rotatable with respect to the first ramp; and,
 at least one rolling element engaged with the first and second ramps;
a first clutch engaged with the first ramp;
a second clutch engaged with the second ramp and including an output having a flange and a clutch hub; and,
a torque sensor including a compression spring and a leaf spring coupling the flange and the clutch hub, wherein:
 the second ramp is arranged to rotate in a first direction with respect to the first ramp to close the second clutch;
 the compression spring urges the flange in a second direction, opposite the first direction, with respect to the clutch hub; and,
 for relative rotation, beyond a first amount, of the flange with respect to the hub in the first direction, the leaf spring urges the flange in the second direction.

* * * * *